Nov. 29, 1955   E. I. VALYI   2,724,878
MOLD-FORMING MACHINE

Filed June 13, 1952   5 Sheets-Sheet 1

INVENTOR
EMERY I. VALYI
BY
*N L Leek*
ATTORNEY

INVENTOR.
EMERY I. VALYI
BY
ATTORNEY

Nov. 29, 1955  E. I. VALYI  2,724,878
MOLD-FORMING MACHINE

Filed June 13, 1952  5 Sheets-Sheet 4

INVENTOR.
EMERY I. VALYI
BY
N. S. Leek
ATTORNEY

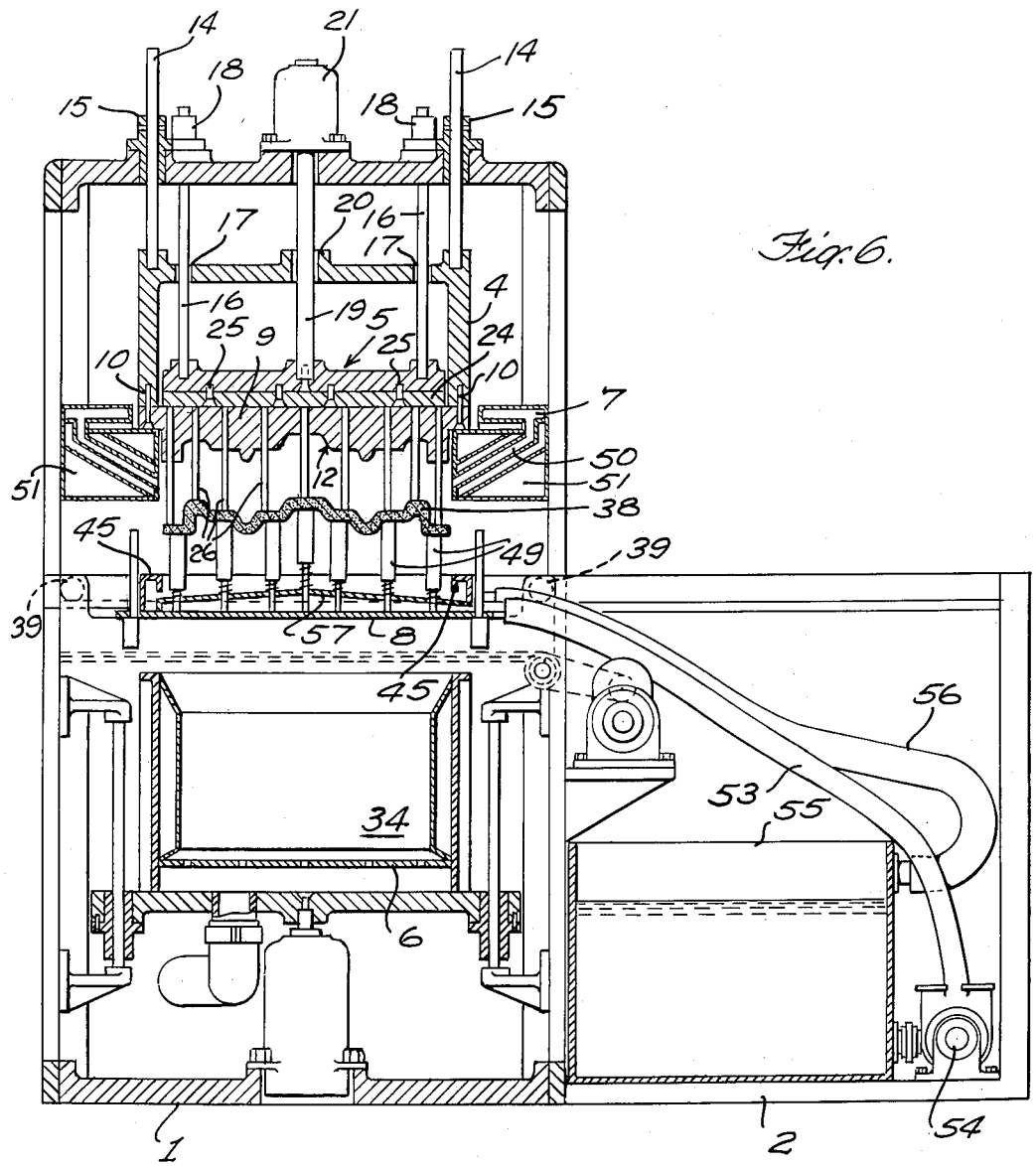

United States Patent Office 2,724,878
Patented Nov. 29, 1955

2,724,878

MOLD-FORMING MACHINE

Emery I. Valyi, New York, N. Y.

Application June 13, 1952, Serial No. 293,317

10 Claims. (Cl. 22—20)

This invention relates to machines for producing foundry molds in shell form from a comminuted mixture of a refractory material and a bonding agent, and it has for its object to provide a novel and improved machine for this purpose.

Another object of the invention is to provide a mold forming machine of the above type having novel and improved means for presenting the comminuted molding material to the forming pattern and for expeditiously removing the excess material from the molding zone after each molding operation.

Another object is to provide a machine of the type specified in which a preheated molding pattern, means for applying molding material thereto and automatically recovering the unused excess material, means for curing the formed molded shell, and means for ejecting and discharging the final product, are all coordinated in a compact self-contained unit which is simple and economical in construction, and in which the complete cycle of operations may be performed repeatedly with minimum effort and supervision on the part of the operator.

Still another object is to provide a shell forming machine of the foregoing type having novel and improved details of construction and features of operation.

Various other objects and advantages will be apparent as the nature of the invention is more fully disclosed.

In producing molded shells in machines of the character referred to above, the usual procedure is to apply an excess quantity of the molding mixture to the face of a preheated metal pattern which is mounted in a suitable pattern carrier. The mixture is held in contact with the pattern until the contacting portion thereof bonds and solidifies into a partially cured shell-like layer having a uniform thickness of, for example, between one-eighth inch and one-quarter inch. The thickness of the shell depends upon the time of contact of the mixture and the temperature of the pattern. The unbonded portion of the mixture is then removed from the pattern which has the partially cured shell thereon. The shell is then subjected to a curing temperature of, for example, between 500° F. and 900° F. until the shell is cured to a hard, rigid, strong condition. The molded shell is then stripped from the pattern, after which the pattern is treated with a parting solution and the operation repeated. The advance treating of the pattern with a parting solution prevents the shell from adhering to the pattern and thus prevents the shell from being broken during the stripping operation.

The present invention is directed to a novel and improved combination of mechanisms which perform all of the foregoing operations more efficiently, with fewer operating parts, and at less expense, than has heretofore been possible. The principal elements of this improved machine are: a pattern carrier carrying the metal pattern which has an exposed surface of any desired contour to be imparted to the molded shell; a heater such as a hot air manifold in the shape of a rectangular frame upon which the pattern is seated, with the molding surface of the pattern unobstructed thereby, throughout the cycle of operations; a movable receptacle or box for the comminuted molding mixture, which I call a "sand and blow box," which is movable into sealing contact with the frame-like heater and from which the molding mixture is elevated by air blast into contact with the molding surface of the pattern, and to which the excess molding mixture automatically returns by gravity when the air blast is cut off; a shell support pan which is movable into the space between the pattern and the retracted sand and blow box and is then adapted to be moved by said box into position to support the now-formed and partially cured shell; means for directing hot air from the hot air manifold over the thus-supported shell to finally cure the latter; an ejector including a plurality of ejector pins which extend into apertures in the pattern and are adapted to be projected through said apertures to eject the completed shell from the pattern onto the shell support pan for removal from the machine; and a spray mechanism associated with the movable shell support pan for treating the pattern with a parting solution at the conclusion of each molding operation.

In the preferred embodiment of the invention, hereinafter more fully described, the frame-shaped hot air manifold is mounted in a horizontal position in the machine, and the metal pattern carried by the pattern carrier rests in sealing contact with the perimetral edge of said manifold with the molding surface of the pattern facing in a downward direction. In operation, the sand and blow box is raised pneumatically or otherwise until its upper rim seals against the lower edge of the manifold. The sand and blow box contains a plurality of riser tubes which are partly submerged in the comminuted molding mixture, and the application of air to said box causes the molding mixture to rise in said tubes and fill the space between the top of the box and the pattern. Since the pattern is heated to the desired bonding temperature, the contacting portion of the molding mixture solidifies into a partially cured shell on the pattern, and when the air pressure is released the excess molding mixture drops back into the box, after which the box is lowered into its original position.

At this time the shell support pan is moved horizontally into position under the pattern which now has the partially cured molded shell adhering to it. Thereupon the sand and blow box is again elevated with the result that it lifts the shell support pan off its carriage and moves it into sealing engagement with the under perimetral edge of the hot air manifold. At the same time a plurality of support studs on the now elevated pan engage the underside of the precured molded shell and support it while a blast of hot air from the manifold is directed over the entire area between the precured shell and the pan. When the hot air blast is cut off at the conclusion of the curing operation, the shell support pan is lowered by the sand and blow box, and at the same time an ejector plate lowers a plurality of ejector pins through the pattern to dislodge the finished shell from the pattern and deposit it on the support studs on the pan which is now moved horizontally outward to its original position to discharge the shell from the machine. Finally, before starting the next molding operation, the horizontally movable pan is again moved beneath the pattern, elevated in the manner previously described, and a cleansing and parting solution is sprayed through the box and upon the pattern to cleanse and lubricate the latter preparatory to the next molding operation.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Fig. 6 is another sectional view similar to Figs. 2, 4 and 5, but illustrating the ejection of the finished shell from the machine.

In the following description certain specific terms are used for convenience in referring to the various details of the invention. These terms, however, are to be interpreted as broadly as the state of the art will permit.

Figure 1:
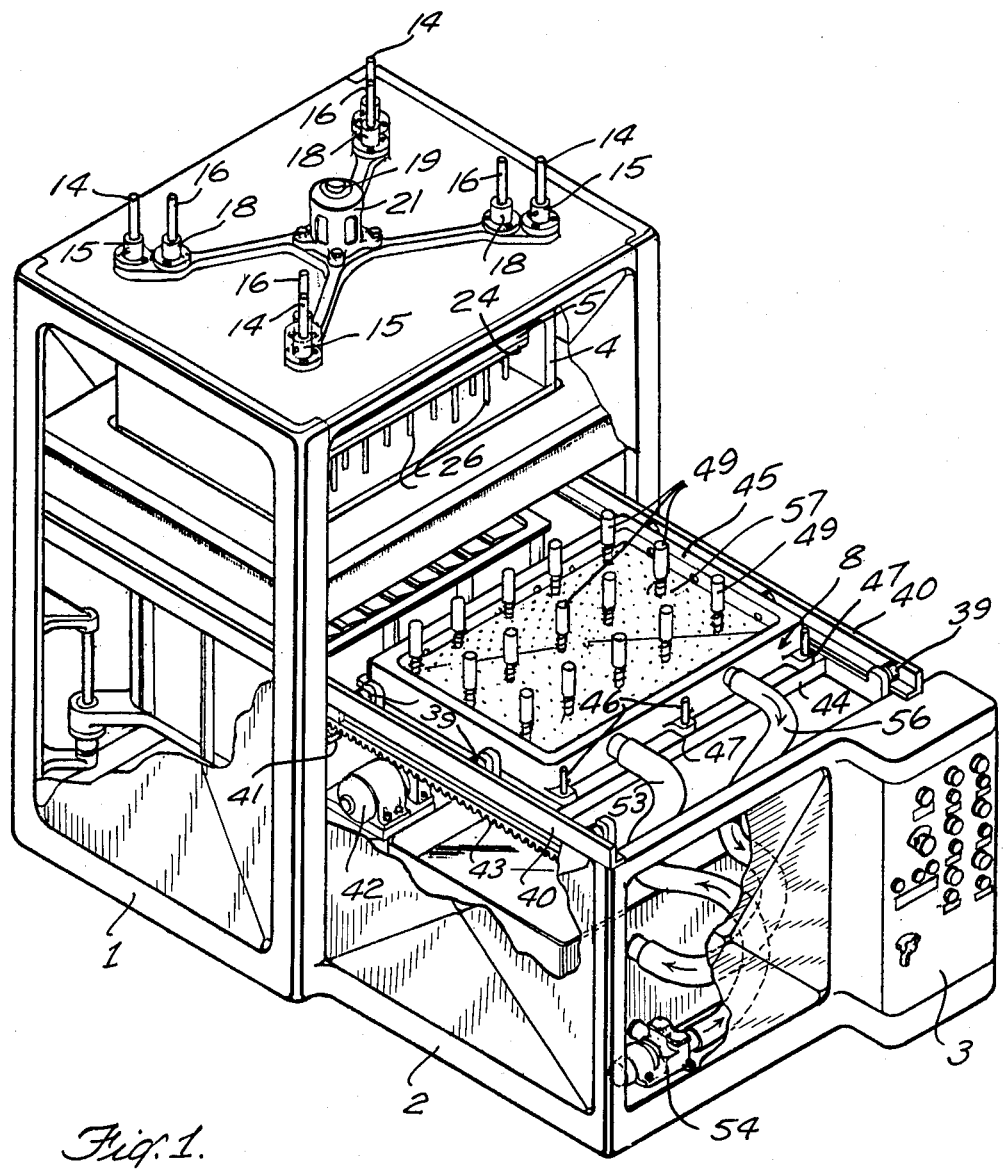
Fig. 1 is a isometric view of a shell forming machine embodying the present invention, portions of the walls of the casing being broken away to illustrate the interior.

The shell forming machine shown in the drawings comprises a rectangular casing 1 having a forward extension 2 of reduced height. As shown in Fig. 1, the extension 2 of the casing has a suitable control panel 3 for controlling the various operations hereinafter described. However, the electrical connections, air lines, etc. between between control panel 3 and the various operating mechanisms form no part of the present invention and therefore will not be described in detail.

The principal elements of the shell forming machine are the mold adaptor or pattern-carrier 4, ejector plate 5, sand and blow box 6, water jacketed hot air manifold 7, and shell support pan 8.

In the embodiment illustrated, the pattern 9 comprises a rectangular metal plate which is secured to pattern carrier 4 by screws 10 and has an under surface 12 of any desired contour corresponding with the shape to be imparted to the refractory molded shell produced by the machine. The purpose of the machine is to form successively, any desired number of identical molded shells.

Figures 2, 3:
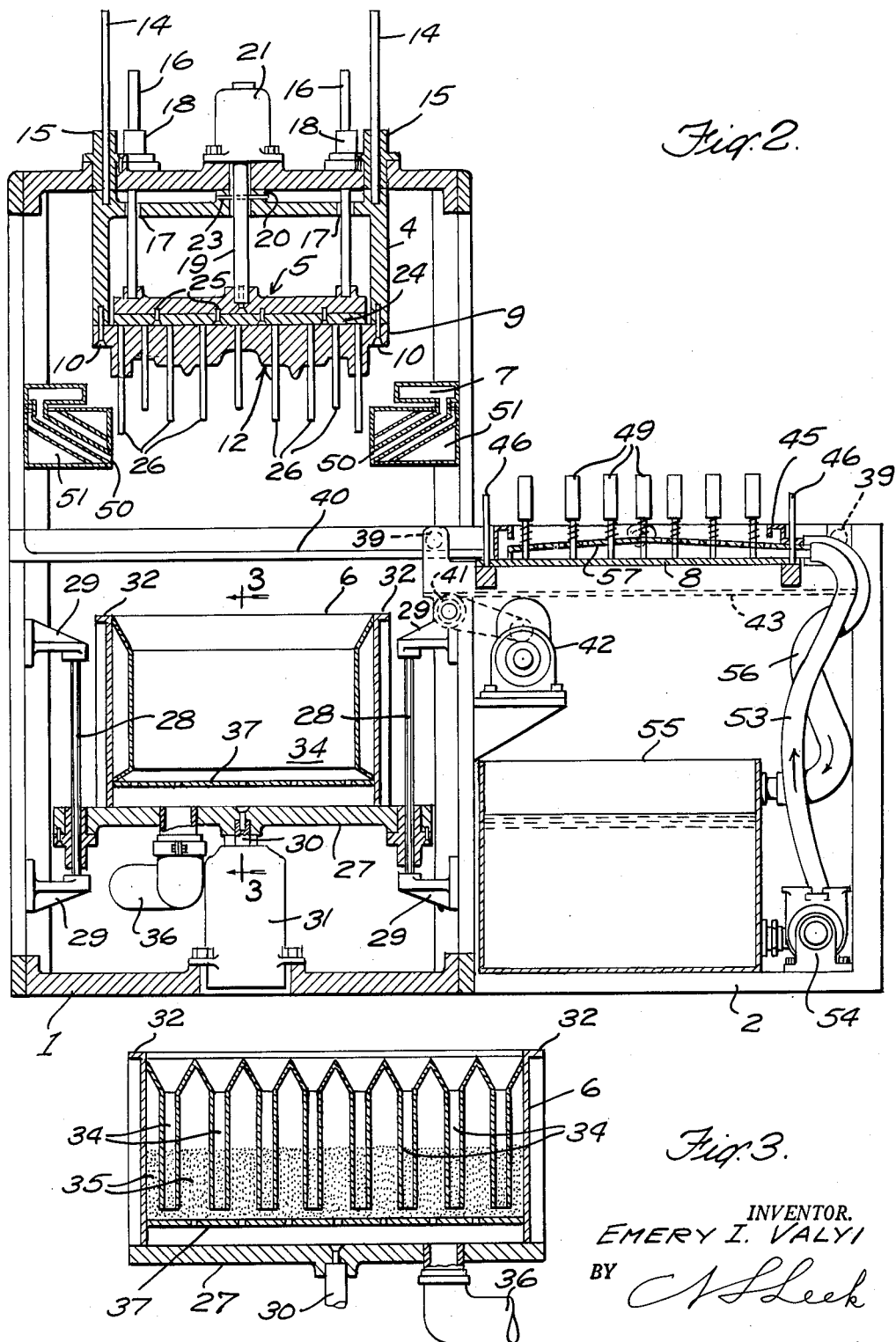
Fig. 2 is a longitudinal vertical section through the machine of Fig. 1, with the parts in the positions they occupy just after the pattern has been inserted in the machine and before the molding operation has started.
Fig. 3 is a vertical section through the sand and blow box, taken on line 3—3 of Fig. 2.
Figure 4:
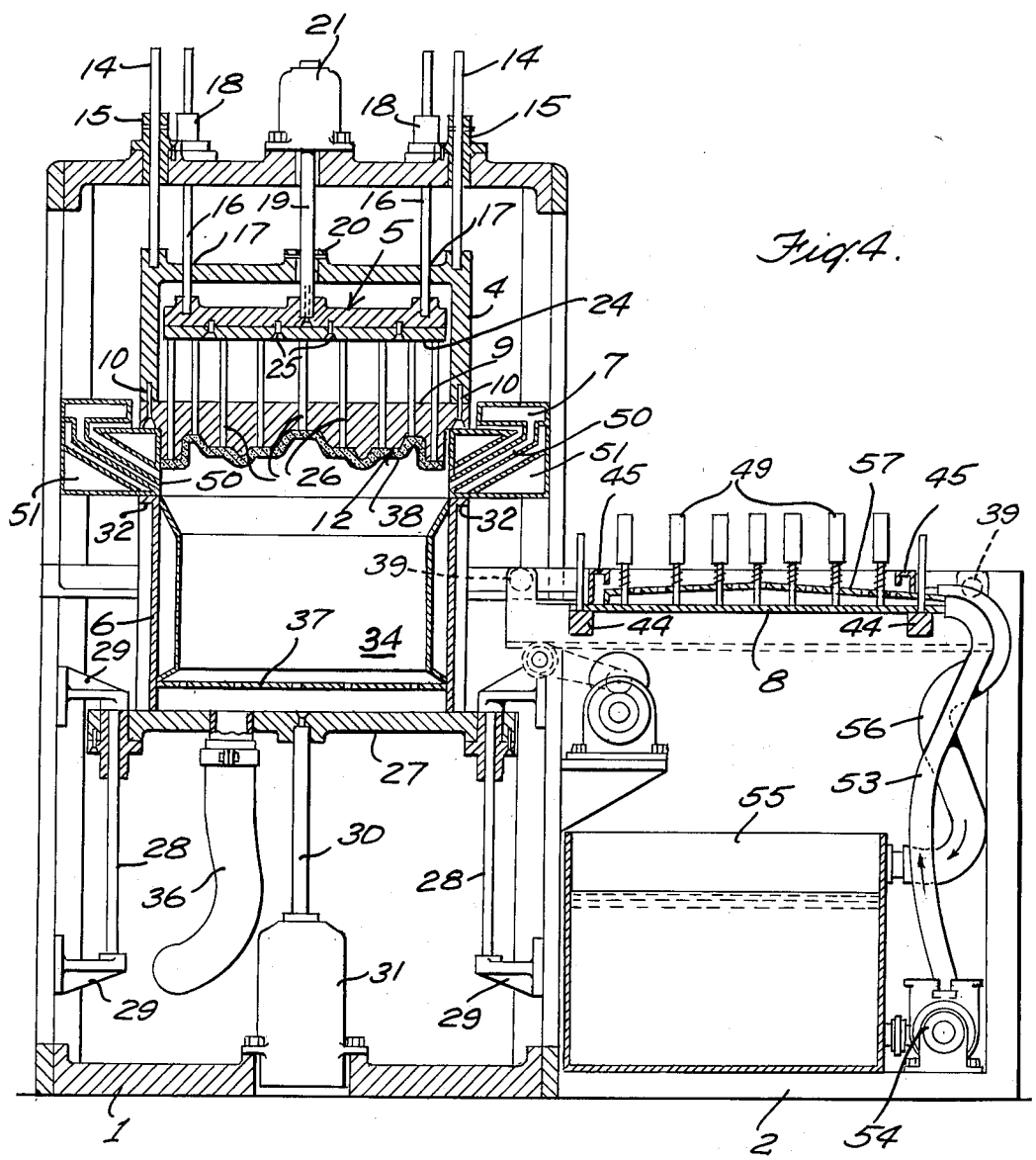
Fig. 4 is a sectional view similar to Fig. 2, but with the parts in the positions they occupy during the coating of the pattern.
Figure 5:
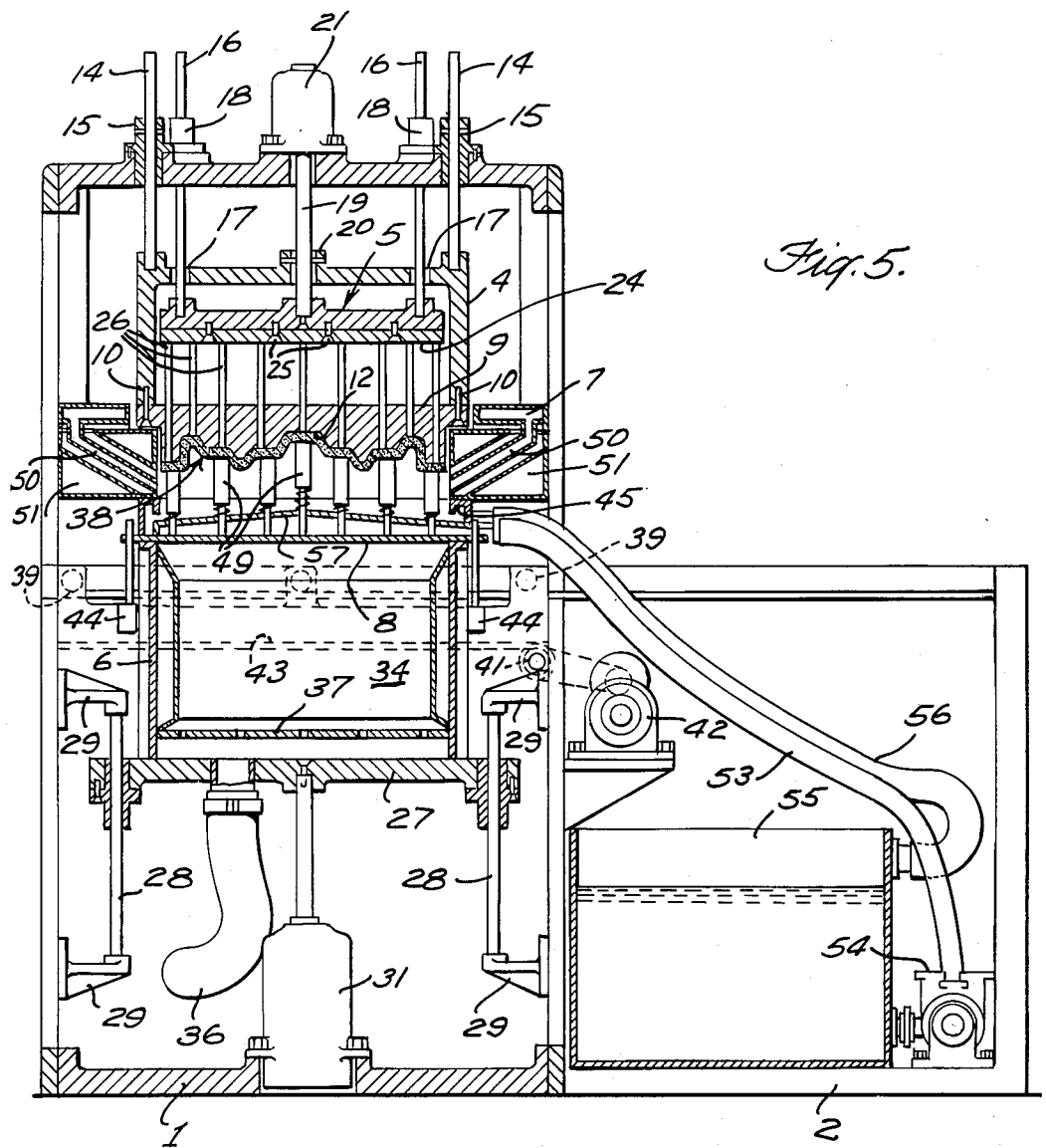
Fig. 5 is a similar longitudinal vertical sectional view, with the parts in position to support the newly formed shell-like coating during the curing operation just prior to ejection.

Throughout the cycle of molding operations hereinafter described the pattern carrier 4 remains stationary in its lowered position as shown in Figs. 4, 5 and 6 with the pattern 9 seated on the edge of the hot air manifold 7. The only time when pattern carrier 4 is raised to the elevated position shown in Fig. 2 is when it is desired to remove the pattern 9 for any purpose, for example to replace it with a different pattern. To facilitate vertical movement of pattern carrier 4, said pattern carrier carries a plurality of vertical guide rods 14 slidably mounted in nipples 15 on the roof of casing 1. Actual raising and lowering of pattern carrier 4 is accomplished with the aid of the vertically movable ejector plate 5, as will now be described.

Ejector plate 5 carries a plurality of vertical guide rods 16 which extend freely through holes 17 in the top of pattern carrier 4 and are slidably mounted in nipples 18 on the roof of casing 1. It also has a vertical piston rod 19 which extends freely through a central collar 20 in the top of pattern carrier 4 and is actuated by pneumatic cylinder 21 on the roof of casing 1. When it is desired to raise pattern carrier 4 the latter is simply coupled to piston rod 19, as by means of key or pin 23 inserted through piston rod 19 and collar 20 (Fig. 2) whereupon elevation of ejector plate 5 by pneumatic cylinder 21 will simultaneously raise pattern carrier 4 to the position shown in Fig. 2. This coupling of piston rod 19 with pattern carrier 4 occurs only on the infrequent occasions mentioned above, and it is therefore effected by hand.

A clamping plate 24 is secured to the underside of ejector plate 5 as by screws 25, and a plurality of vertical ejector pins 26 are securely clamped between said plates 5 and 24. The ejector pins 26 extend through vertical holes in pattern 9 and the length of each such pin 26 is determined by the depth of that portion of pattern 9 which is pierced by said pin. During the actual coating of pattern 9 to form the refractory shell-like mold, the ejector pins 26 are retracted. But, when ejector plate 5 is lowered for the purpose of ejecting the finished refractory molded shell, the ejector pins 26 descend through pattern 9 and exert a uniform downward "push" at numerous points on the shell and gently but quickly dislodge it from the pattern as shown in Fig. 6.

The sand and blow box 6 is mounted on a vertically movable platform 27 beneath the pattern carrier 4 carrying pattern 9. The platform 27 moves on vertical guide rods 28 mounted on brackets 29 in casing 1, and the movement of platform 27 is effected by piston rod 30 of pneumatic cylinder 31. During the time that the shell is being formed on the surface 12 of pattern 9 the platform 27 is in the elevated position shown in Fig. 4 with the upper rim 32 of sand and blow box 6 in sealing contact with the lower edge of hot air manifold 7. The sand and blow box 6 contains a plurality of elongated riser tubes 34 which are partly submerged in the comminuted refractory material 35, which may comprise an intimate mixture of silica-sand and a heat softening, curable resin binder, as shown in Fig. 3.

When the upper rim 32 of sand and blow box 6 is sealed against the lower edge of hot air manifold 7 (as in Fig. 4) air pressure is admitted through the air connection or hose 36. The air pressure will cause the comminuted refractory mixture 35 to rise in the riser tubes 34 and to fill the space between the top of sand and blow box 6 and the under surface 12 of pattern 9. Thus the refractory material 35 will be in contact with the pattern 9 which was previously preheated to the desired coating temperature by the adjacent hot air manifold 7. The refractory material 35 will remain in contact with the pattern 9 due to the continued application of air pressure in hose 36 for the length of the coating dwell. Thereafter the air pressure will be released and the free refractory material 35 will flow back into the sand and blow box 6. For better distribution of the air pressure in box 6, a perforated blow plate 37 is provided in the box between the platform 27 and the lower ends of riser tubes 34, as shown in Fig. 3.

Upon completion of the coating operation as above described, the sand and blow box 6 is lowered to its original position. Thereupon the shell support pan 8 is caused to move into position under the pattern 9 which now has a partially precured shell-like mold 38 adhering to it. In the embodiment illustrated, the shell support pan 8 rests on a frame or carriage 44 having a plurality of rollers 39 mounted on a pair of horizontal angle-shaped tracks 40 which extend through the casing 1 and its forward extension 2, as best shown in Fig. 1. Movement of the pan 8 is effected by a pinion 41 which is driven by electric motor 42 and meshes with rack 43 on the pan frame 44, although pneumatic means may be employed for this purpose if desired.

When the shell support pan 8 reaches the aforesaid position directly under the pattern 9 carrying molded shell 38, the sand and blow box 6 is again elevated by pneumatic cylinder 31 so that the upper rim 32 of the box engages the bottom of pan 8, lifting the pan off its carriage 44 until the upper rim 45 of the pan rests in sealing contact with the bottom of hot air manifold 7, as in Fig. 5. The carriage 44 of pan 8 has a plurality of vertical guide rods 46 extending through lugs 47 on the pan to guide the pan in its vertical movement. The pan 8 has a plurality of upstanding support studs 49 actuated by light coil springs, as shown in Figs. 1, 5 and 6, and positioned to engage the back of the partially precured mold shell 38 upon elevation of the pan as aforementioned. This is necessary because the precured shell 38 requires support during the curing operation which will now be described.

When the parts are in the aforementioned position, with the upper rim 45 of pan 8 sealed against the bottom of hot air manifold 7 as shown in Fig. 5, a hot air blast from any suitable source under pressure is caused to enter the manifold 7 from which said air at a predetermined curing temperature is directed through the manifold's air ducts 50 into the entire space between the shell 38 and the pan 8. Manifold 7 is surrounded by a water jacket 51 so as to prevent the comminuted refractory material 35 from adhering to the manifold walls during the blowing operation previously described. The hot air blast is maintained for the length of time required for curing the shell, and then shut off. Following the curing, the pan 8 is lowered by lowering the sand and blow box 6 (Fig. 6). Simultaneously with such lowering of pan 8, pneumatic cylinder 21 is actuated to lower the ejector plate 5 which lowers the ejector pins 26. The movement of pan 8 and of the ejector pins 26 occurs at the same time so that the molded shell 38 rests substantially on the studs 49 when the ejector pins have travelled full stroke, as shown in Fig. 6. The pneumatic cylinder 21 is then actuated to raise ejector plate 5 and retract the pins 26 to the position which they occupy in Figs. 4 and 5. When the pins 26 are thus retracted, the molded shell 38 is left resting on the studs 49. The shell support pan 8 is now returned to its original position (as in Figs. 1, 2 and 4) thus discharging the molded shell 38 from the machine.

Upon removal of mold shell 38 from the machine, pan 8 is again positioned under the pattern 9 and lifted by box 6, as previously described, until a closed space is thus formed between pan 8, manifold 7 and pattern 9. At this time a pressure spray is turned on through hose or conduit 53 by means of pump 54, conveying a suitable cleansing and parting solution from tank 55 into the pan 8. This solution impinges upon pattern 9 and causes it to be cleansed and lubricated for the next coating operation. The excess solution flows back into tank 55 through drain connection 56. For better draining, a drain board 57 is provided in pan 8.

If pattern 9 at this time is at the proper temperature for the next coating operation, pan 8 is lowered and withdrawn to its original position as shown in Fig. 1. On the other hand, if pattern 9 requires temperature adjustment, the hot air blast may be turned on through manifold 7 before such removal of pan 8, for the length of time necessary to raise the pattern temperature.

It will be evident from the foregoing description that the pattern 9 is not required to be moved at any time during the operation of the machine. The only time it is necessary to move the pattern is when it is to be removed for replacement or other purposes, and at such time the elevation and removal of the pattern are accomplished as previously described in connection with Fig. 2.

Although a specific embodiment has been shown and described herein for purposes of illustration, it will be evident to those skilled in the art that the invention is capable of various modifications and adaptations within the scope of the appended claims.

What is claimed is:

1. A machine for producing shell molds from a comminuted mixture of refractory material and a bonding agent, comprising a pattern-carrier having a pattern mounted face down thereon, a hot air manifold substantially surrounding and engaging the outer edge of said pattern, an ejector plate slidably supported by said pattern-carrier in spaced relation thereto, a plurality of ejector pins on said ejector plate extending into apertures in said pattern, means for moving said ejector plate to project said ejector pins through said apertures beyond the face of said pattern for ejecting a molded shell from said pattern, a receptacle for a molding mixture movable upwardly into sealing contact with said manifold in proximity to said pattern, means including a source of air pressure and a plurality of tubes in said receptacle for forcing said molding mixture into contact with said pattern and for catching the excess molding mixture upon release of said air pressure, a carriage movable into the space between said pattern and said receptacle, a shell support pan movably mounted on said carriage and movable by said receptacle into sealing engagement with said manifold, supporting studs on said pan conformable with the contour of said pattern for engaging and supporting the molded shell formed on the face of said pattern, means including air ducts in said manifold for supplying hot air to the space between said pan and said pattern to further cure said shell, a container for a cleansing and parting solution, and means including supply and return conduits connecting said container to said pan for circulating said solution through the space formed by said pan and said pattern for cleansing the latter.

2. A machine for producing shell-like molds from a comminuted molding mixture of a refractory material and a bonding agent, comprising a pattern-carrier having a pattern mounted face down thereon, a hot air manifold supporting the outer edge of said pattern, a vertically movable ejector plate in said carrier, a plurality of ejector pins on said ejector plate extending into apertures in said pattern, means for moving said ejector plate up and down to move said ejector pins through said apertures, a vertically movable receptacle for said molding mixture movable into contact with the under side of said manifold, means including a source of air pressure and a plurality of riser tubes in said receptacle for elevating said molding mixture into contact with said pattern and for catching the excess molding mixture dropped by gravity upon release of said air pressure, a carriage movable into the space between said pattern and said receptacle, a shell support pan movable vertically on said carriage and adapted to be engaged and elevated by said receptacle into engagement with said manifold, means on said pan conformable with the contour of said pattern for engaging and supporting the molded shell formed on the face of said pattern, means including air ducts in said manifold for supplying hot air to the space between said pan and said precured shell to cure the latter, and means carried by said pan for circulating a cleansing fluid through the space formed by said pan and said pattern for cleansing the latter.

3. A machine for producing shell-like molds from a comminuted molding mixture of a refractory material and a bonding agent, comprising a pattern-carrier having a pattern mounted face down thereon, a hot air manifold substantially surrounding and supporting the outer edge of said pattern, a vertically movable ejector plate in said carrier, a plurality of ejector pins on said ejector plate extending into apertures in said pattern, means for moving said ejector plate up and down to move said ejector pins through said apertures, a vertically movable receptacle for said molding mixture movable into sealing contact with the under side of said manifold, means including a source of air pressure and a plurality of riser tubes in said receptacle for elevating said molding mixture into contact with said pattern and for catching the excess molding mixture dropped by gravity upon release of said air pressure, a carriage movable horizontally into the space between said pattern and said receptacle, a shell support pan movable vertically on said carriage and adapted to be engaged and elevated by said receptacle, a rim on the upper edge of said pan for sealing engagement with said manifold in the elevated position of said pan, supporting studs on said pan conformable with the contour of said pattern for engaging and supporting the molded shell formed on the face of said pattern, means including air ducts in said manifold for supplying hot air to the space between said pan and said precured shell to cure the latter, and means carried by said pan for circulating a cleansing liquid through the space formed by said pan and said pattern for cleansing the latter.

4. A machine for producing shell-like molds from a comminuted molding mixture of a refractory material and a bonding agent, comprising a pattern-carrier having a pattern mounted face down thereon, a hot air manifold substantially surrounding and supporting the outer edge of said pattern, a vertically movable ejector plate in said carrier, a plurality of ejector pins on said ejector plate extending into apertures in said pattern, means for moving said ejector plate up and down to move said ejector pins through said apertures, a vertically movable receptacle for said molding mixture movable into sealing contact with the under side of said manifold, means including a source of air pressure and a plurality of riser tubes in said receptacle for elevating said molding mixture into contact with said pattern and for catching the excess molding mixture dropped by gravity upon release of said air pressure, a carriage movable horizontally into the space between said pattern and said receptacle, a shell support pan movable vertically on said carriage and adapted to be engaged and elevated by said receptacle, a rim on the upper edge of said pan for sealing engagement with said manifold in the elevated position of said pan, supporting studs on said pan conformable with the contour of said pattern for engaging and supporting the molded shell formed on the face of said pattern, means including air ducts in said manifold for supplying hot air to the space between said pan and said precured shell to cure the latter, a container for a cleansing and parting solution, and means including supply and return conduits connecting said container to said pan for circulating said solution through the space formed by said pan and said pattern for cleansing the latter.

5. A machine for producing shell-like molds from a comminuted molding mixture of a refractory material and a bonding agent, comprising a vertically movable pattern-carrier, a pattern removably mounted face down on the under side of said carrier, a hot air manifold substantially surrounding and supporting the outer edge of said pattern, a vertically movable ejector plate in said carrier, a plurality of ejector pins on said ejector plate extending into apertures in said pattern, means for moving said ejector plate up and down to move said ejector pins through said apertures, means for coupling said carrier to said ejector plate to raise said pattern out of contact with said manifold upon elevation of said ejector plate, a vertically movable receptacle for said molding mixture movable into sealing contact with the under side of said manifold, means including a source of air pressure and a plurality of riser tubes in said receptacle for elevating said molding mixture into contact with said pattern and for catching the excess molding mixture dropped by gravity upon release of said air pressure, a carriage movable horizontally into the space between said pattern and said receptacle, a shell support pan movable vertically on said carriage and adapted to be engaged and elevated by said receptacle, a rim on the upper edge of said pan for sealing engagement with said manifold in the elevated position of said pan, spring-pressed supporting studs on said pan conformable with the contour of said pattern for engaging and supporting the molded shell formed on the face of said pattern, means including air ducts in said manifold for supplying hot air to the space between said pan and said precured shell to cure the later, a container for a cleansing and parting solution, and means including supply and return conduits connecting said container to said pan for circulating said solution through the space formed by said pan and said pattern for cleansing the latter.

6. A machine for producing molded shells from a comminuted mixture of refractory material and a bonding agent, comprising a pattern-carrier having a pattern mounted face down thereon, ejector means on said pattern carrier for engaging and ejecting a molded shell from the face of said pattern, a receptacle for a molding mixture having a top enclosure means movable upwardly to enclose the space below said pattern, means including a source of fluid pressure and a plurality of tubes in said receptacle for raising said molding mixture within said receptacle into contact with said pattern, a carriage movable into the space between said pattern and said receptacle, a shell support movably mounted on said carriage, and means including ducts for supplying hot fluid to the space between said carriage and said pattern to further cure said shell.

7. A machine for producing molded shells from a comminuted mixture of refractory material and a bonding agent, comprising a pattern-carrier having a pattern mounted face down thereon, a manifold substantially surrounding and engaging the outer edge of said pattern, ejector means for engaging and ejecting a molded shell from the face of said pattern, a receptacle for a molding mixture having a top enclosure means movable upwardly into engagement with said manifold to form with said manifold a closed space below said pattern, means including a source of fluid pressure for raising said molding mixture within said receptacle into contact with said pattern, a carriage movable into the space between said pattern and said receptacle, said carriage having means for engaging and supporting the molded shell, and means including ducts in said manifold for supplying hot fluid to the space below said pattern to further cure said shell.

8. A machine for producing molded shells from a comminuted mixture of refractory material and a bonding agent, comprising a pattern-carrier having a pattern mounted face down thereon, a manifold substantially surrounding and engaging the outer edge of said pattern, a plurality of ejector pins extending into apertures in said pattern, means to project said ejector pins through said apertures beyond the face of said pattern for ejecting a molded shell from said pattern, a receptacle for a molding mixture having a top enclosure means movable upwardly into sealing contact with said manifold to form therewith a closed space below said pattern, means including a source of fluid pressure for raising said molding mixture within said receptacle into contact with said pattern, a carriage movable into the space between said pattern and said receptacle, a shell support pan movably mounted on said carriage and movable into sealing engagement with said manifold to form a closed space below said pattern, means on said pan conformable with the contour of said pattern for engaging and supporting the molded shell, and means including ducts in said manifold for supplying hot fluid to the space between said pan and said pattern to further cure said shell.

9. A machine for producing molded shells from a comminuted mixture of refractory material and a bonding agent, comprising a pattern-carrier having a pattern mounted face down thereon, a manifold substantially surrounding and engaging the outer edge of said pattern, a plurality of ejector pins extending into apertures in said pattern, means to project said ejector pins through said apertures beyond the face of said pattern for ejecting a molded shell from said pattern, a receptacle for a molding mixture having a top enclosure means movable upwardly into sealing contact with said manifold to form therewith a closed space below said pattern, means including a source of fluid pressure for raising said molding mixture within said receptacle into contact with said pattern, a carriage movable into the space between said pattern and said receptacle, a shell support pan movably mounted on said carriage and movable into sealing engagement with said manifold to form a closed space below said pattern, means on said pan conformable with the contour of said pattern for engaging and supporting the molded shell, means including ducts in said manifold for supplying hot fluid to the space between said pan and said pattern to further cure said shell, and means carried by said pan for contacting said pattern with a cleansing fluid for cleansing the face of the pattern.

10. A machine for producing molded shells from a comminuted mixture of refractory material and a bonding agent, comprising a pattern-carrier having a pattern mounted face down thereon, means for heating said pattern, a receptacle for a molding mixture having a top enclosure means to enclose the space below said pattern, means forming a plurality of passages in said space below said pattern, and means applying fluid pressure to the molding mixture in said receptacle for raising said molding mixture through said passages into contact with said pattern for forming a mold shell thereon.

References Cited in the file of this patent

UNITED STATES PATENTS

| 1,492,355 | Campbell | Apr. 29, 1924 |
| 2,425,362 | Cherry et al. | Aug. 12, 1947 |
| 2,542,243 | Gedris | Feb. 20, 1951 |

FOREIGN PATENTS

| 832,936 | Germany | Mar. 3, 1952 |

OTHER REFERENCES

The Iron Age, April 19, 1951, pages 81–85.